Patented Nov. 13, 1928.

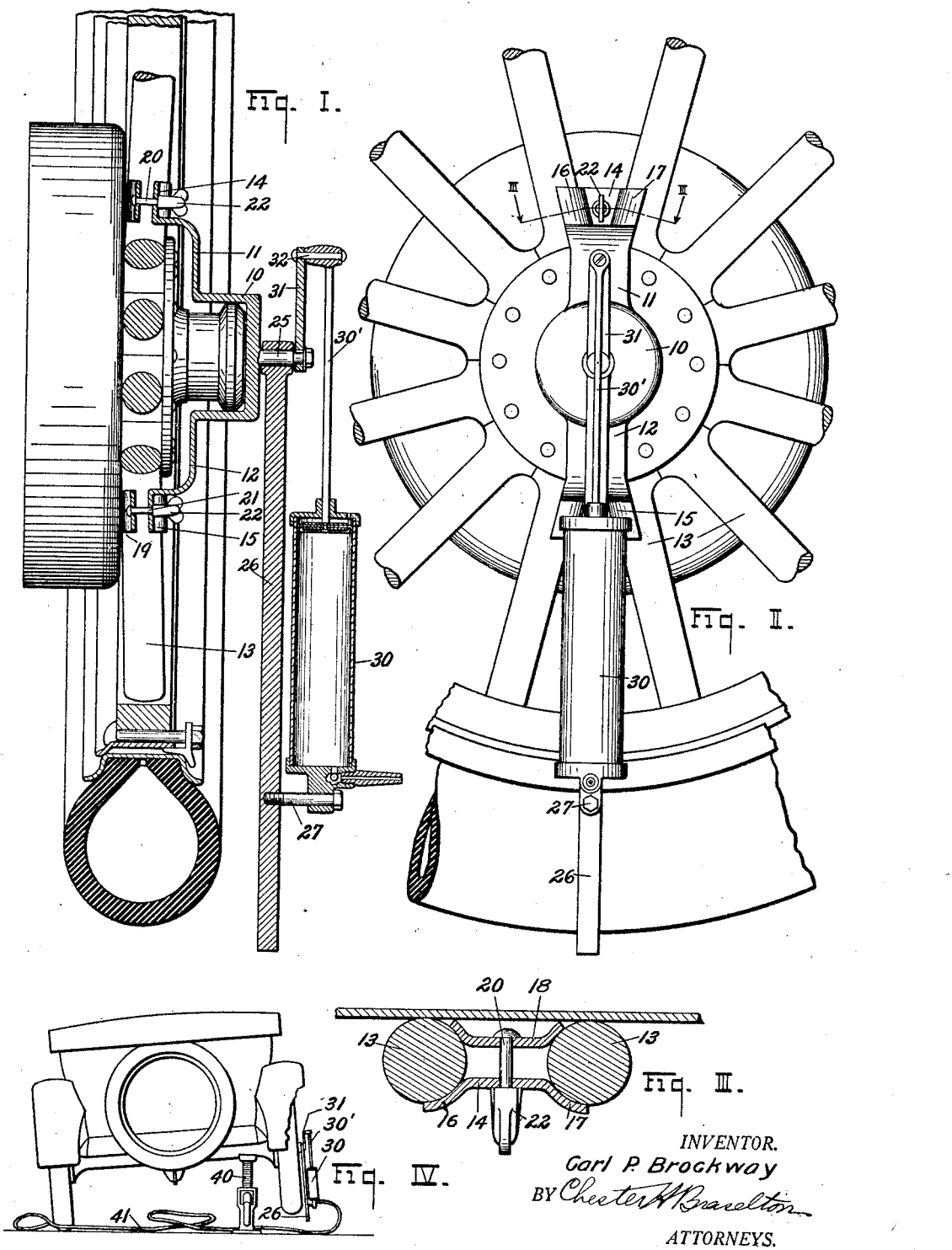
Nov. 13, 1928.
C. P. BROCKWAY
POWER TIRE PUMP
Filed Jan. 6, 1921
1,691,108
INVENTOR.
Carl P. Brockway
BY Chester H Braselton
ATTORNEYS.

1,691,108

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

POWER TIRE PUMP.

Application filed January 6, 1921. Serial No. 435,380.

The present invention relates to a pump operating means and it has for its object the idea of providing some means whereby any suitable pump—such as that used for inflating tires, for example—may be readily operated from some rotary or other source of power, as, for example, a wheel of an automobile. The invention therefore contemplates the provision of suitable mechanical means which may form the connecting link between an available source of power and an air pump; to which end an attachable and detachable mechanism is provided which is adapted to be clamped to any moving part of any mechanism, as to a wheel of an automobile, and transmit the motion thereof to operate a pump, having the use in connection with a motor vehicle of providing power means for pumping air into the tires when the vehicle engine is running and when one or both rear wheels are jacked up.

Further objects are to provide such an instrumentality in as few parts as possible, and which is also so made that the attachment itself may operate as a jack for the vehicle wheel, if desired. The invention contemplates further a simplified construction of such a mechanism made of as few parts as possible and easily attachable and detachable to a wheel and so designed as to support the pump itself and at the same time prevent any part of the wheel, as the spokes, tire, etc. from coming in contact with the pump during operation.

In the specific embodiment disclosed, several mechanical features of note are provided, such as rigidity and strength of the device, the simplified way of clamping the same to the spokes of a wheel, for example, and the provision in the support for the pump, of attaching opposite ends of the pump with the support, so as to permit the device to properly and simply perform the functions required.

Further objects of the invention will appear from the following description. One embodiment of the invention is shown. Figure I is a vertical sectional view of the pump and the attachment applied to a rear wheel of an automobile, the pump support itself operating as a lifting jack for the wheel.

Figure II is a side elevation of the part of the wheel shown in Figure I.

Figure III is a section taken on the line 3—3 of Figure II.

Figure IV is an illustration of the manner of use of the device where the ordinary lifting jack is employed.

Various mechanical arrangements could be advantageously employed in carrying this invention into effect but the details I have shown have been found to be particularly satisfactory. Thus, I provide a central casting or plate member 10 adapted to fit over the hub of a wheel and having extended arms 11 and 12 suitably shaped to be clamped to the spokes 13. A satisfactory arrangement is shown in the extensions 14 and 15 which extend between the two spokes 13 as shown in Figure III, and are provided with contacting portions 16 and 17 on either side of the web 14, shaped to correspond to the contour of the spokes. Co-operating clamping pieces 18 and 19 are connected through the bolts 20 and 21 with the extensions 14 and 15 respectively. Manually operable wing nuts 22, for example, are shown as a means for binding the extensions and pieces together to clamp the apparatus to the spokes of the wheel so as to rotate the member 10. The clamping pieces 18 and 19 may be of such shape and width that the device may be attached and detached by unscrewing the wing nuts 22 a certain distance without wholly detaching the pieces 18 and 19 from the attachment.

The plate 10 is provided with a central extending stub shaft or hub 25 adapted to form a bearing for a pump supporting member 26 which is provided with any suitable means at one end, as a bolt 27, for supporting the pump 30 in the manner illustrated. The bearing or stub shaft 25 is provided with a cranking arm 31 adapted to be suitably connected as through a pivot pin 32 to the pump piston rod 30′ which thus maintains the proper position of this end of the pump.

The pump support 26 may be made of such length relative to the radius of the wheel as to extend below the fully inflated tire and hence the same may be employed as a jack as well as a pump supporting element, and should contact with the ground to prevent rotation of the pump with the wheel.

In Figure IV a vehicle is shown as supported by an ordinary jack 40 and a flexible tube 41 connects the pump 30 with the tire on the wheel on the other side of the vehicle.

The operation of the mechanism will be readily understood. Rotation of the wheel rotates the clamped plate 10 and therewith the stub shaft 25, which operates crank 31, to reciprocate the pump piston rod 30'. If applied to the rear wheel of a vehicle, the wheel is jacked up and the engine may be rotated to drive the free wheel through the differential of the automobile as will be readily understood. A tire on another vehicle wheel may thereby be inflated. The device is then applied to another wheel and the tire of the wheel to which the device was first attached may then be inflated.

It is obvious that many variations in such a mechanism may be made without departing from the scope of the invention.

What I desire to claim for Letters Patent of the United States is:

1. In a device of the class described, the combination of a central member adapted to pass over the wheel hub of an automobile, extensions on said member for clamping the same to the supports of the hub, an outwardly extending stub shaft carried by said central member, a support for a pump connected to said shaft and a crank arm operated by said stub shaft for operating the pump.

2. In a device of the class described the combination of a member adapted to be clamped to the spokes of an automobile wheel; a pump supporting element, said member being formed with an outwardly extending portion adapted to form a bearing for the wheel and said pump supporting element; and a pump element carried by said pump supporting element and adapted to be operated by the member clamped to the spokes of the wheel.

3. In an attachable and detachable pump operating mechanism, a central supporting member adapted to pass over the hub of the wheel of an automobile, an extension adapted to clamp said member to said wheel provided with a portion shaped to correspond to the contour of the wheel spoke, a clamping piece on the opposite side of said spoke, likewise shaped to fit said spoke and manually operable means for clamping said two members to said spoke.

In testimony whereof, I affix my signature.

CARL P. BROCKWAY.